United States Patent [19]

Andersen

[11] Patent Number: 4,891,719
[45] Date of Patent: Jan. 2, 1990

[54] FAST CLOSURE METHOD FOR A DATA SIGNAL CHANNEL

[75] Inventor: Robert D. Andersen, West Covina, Calif.

[73] Assignee: Datatape Incorporated, Pasedena, Calif.

[21] Appl. No.: 252,842

[22] Filed: Oct. 3, 1988

[51] Int. Cl.⁴ .............................................. G11B 15/14
[52] U.S. Cl. ...................................................... 360/65
[58] Field of Search ............................... 360/31, 65, 67

[56] References Cited

U.S. PATENT DOCUMENTS

| | | | |
|---|---|---|---|
| 3,082,373 | 3/1963 | Hooke et al. | 324/57 |
| 3,504,977 | 4/1970 | Matthews | 356/89 |
| 4,062,154 | 12/1977 | Huguenia et al. | 51/319 |
| 4,193,039 | 3/1980 | Massa et al. | 328/162 |
| 4,295,168 | 10/1981 | Müller | 360/31 |
| 4,297,730 | 10/1981 | Kadowaki et al. | 360/65 |
| 4,416,067 | 11/1983 | Scherer et al. | 33/356 |
| 4,745,565 | 5/1988 | Garwin et al. | 364/571 |

FOREIGN PATENT DOCUMENTS 2119557  11/1983  United Kingdom .................. 360/31

*Primary Examiner*—Vincent P. Canney
*Attorney, Agent, or Firm*—William F. Noval

[57] ABSTRACT

Disclosed is a fast closure method for use in the calibration of a data signal channel, such as the record/reproduce channel of a magnetic tape recorder. The method results in fewer iterations of a calibration procedure which reduces the difference between a measured channel response and a target channel response to bring the channel response within acceptable response limits. According to the method, the control value is originally set at mid range and the channel response measured. If the channel response is too low, the control value is set at 75%, and if the response is too high, the control value is set at 25%. The channel response is measured again and from the last two measured channel responses a transfer slope is calculated. A projected control value is determined from this slope based on the desired response of the channel.

1 Claim, 3 Drawing Sheets

FAST CLOSURE METHOD FOR A DATA SIGNAL CHANNEL

BACKGROUND OF THE INVENTION

This invention relates in general to the calibration of a data signal channel. More particularly, this invention relates to a fast closure method for use in calibrating a data signal channel such as the record/reproduce channel of a magnetic tape recorder. The method of the invention reduces the number of iterations required of the calibration procedure to bring the channel response within acceptable error limits.

A data signal channel, such as a record/reproduce channel of a magnetic tape recorder, must be calibrated (sometimes frequently) because of changes in the response of the channel due to changes in the characteristics of the components of the channel. Thus, in a record/reproduce channel of a magnetic tape recorder, the magnetic record and reproduce heads are subjected to wear through constant abrasion by magnetic tape, thus, changing the frequency response of the heads over time. Such changes in frequency response introduce frequency and phase distortion into a signal transmitted over the data signal channel. This distortion is undesirable since an ideal data signal channel should have minimal effect on a transmitted signal. Thus, it is desirable that the channel response be uniform.

In order to adjust for changes in channel response, it is customary to periodically calibrate the response of a data signal channel. Typically, the calibration procedure is effected by transmitting a known waveform signal over the channel and measuring the response of the channel to the known signal. Any distortion introduced by the channel into the signal, will result in a measured signal response which is different from the expected signal response. If the difference or error is not within acceptable limits, then control elements in the data signal channel are adjusted and the calibration procedure repeated. This procedure is reiterated until the channel response is brought within acceptable limits. It has been found that such a calibration procedure normally requires several iterations to effect a channel response which is acceptable. In a multispeed, multichannel magnetic tape recorder, effecting a calibration procedure for each channel, at each speed is a time-consuming task. For example, if the magnetic tape recorder is operable at eight different tape speeds and includes 20 data channels, the calibration procedure must be carried out 160 times. There is thus a need in the art for a method for effecting calibration of a data signal channel which is accurate, effective and fast.

SUMMARY OF THE INVENTION

According to the present invention, there is provided a fast closure method for use in a calibration procedure of a data signal channel which obviates the disadvantages of the prior art. According to an aspect of the present invention, a slope calculation technique is used to reduce the number of iterations of the calibration procedure in order to achieve channel response within acceptable limits. According to another aspect of the present invention, a data signal channel to be calibrated, has at least one adjustable control element which is adjusted during the calibration procedure to effect change in the channel response. The control element is initially set to mid value and the channel response measured. If the response is lower than the expected response value, then on the second iteration, the control element is set at a value of 75%. If the response of the channel is measured as higher then the expected response, then the expected control element is set at a 25% value. The response of the channel is measured again and from the last two measured responses a transfer slope is calculated. From this slope, a projected control value is calculated based upon the expected channel response. The slope calculation technique is repeated until the channel response is brought within acceptable limits.

BRIEF DESCRIPTION OF THE DRAWINGS

In the detailed description of the preferred embodiment of the invention presented below, reference is made to the accompanying drawings in which like elements are provided with like numbers.

DESCRIPTION OF THE PREFERRED EMBODIMENT

Figure 1:
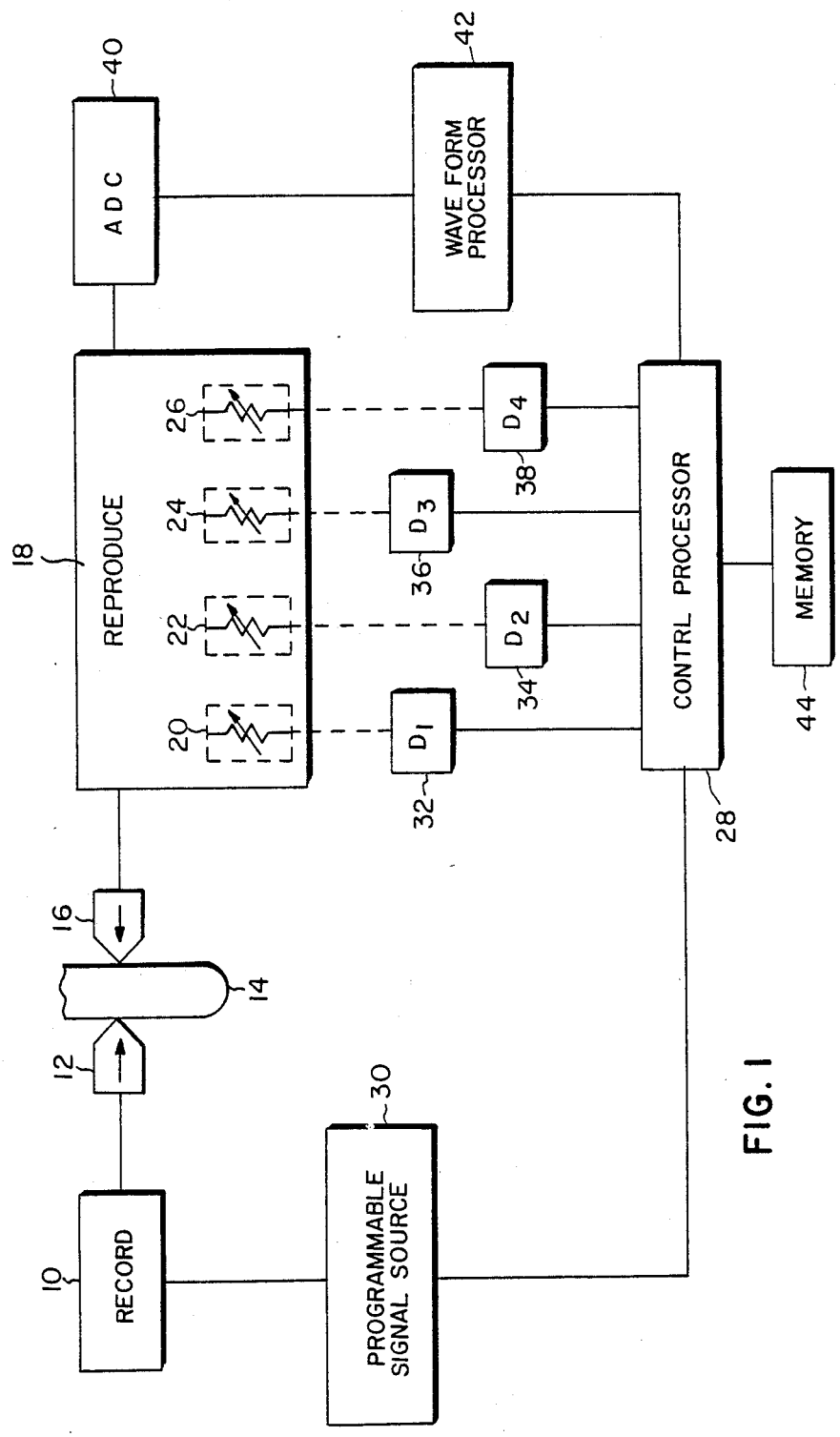
FIG. 1 is a block schematic diagram of apparatus for carrying out the method of the present invention.

Referring now to FIG. 1, there is shown apparatus for carrying out the method of the present invention. The apparatus of FIG. 1 includes a data signal channel of a magnetic tape recorder. This channel includes record circuit 10, record magnetic head 12 for recording a data signal on magnetic tape 14, a reproduce head 16 for reproducing a data signal from magnetic tape 14, and reproduce circuit 18 for amplifying and equalizing the reproduce signal. Reproduce circuit 18 includes adjustable control elements (resistors) 20, 22, 24 and 26, which are adjustable at different selected frequencies during a calibration procedure to effect uniform signal response of the channel. Preferably, the calibration procedure is that disclosed in U.S. patent application Ser. No. 252,843 entitled "Autocalibration Of A Data Signal Channel With Simultaneous Control Signals", Inventor R. D. Andersen. As disclosed in this patent application, a data signal channel to be calibrated is stimulated with a complex waveform having harmonic content at frequencies where the adjustable frequency sensitive control elements 20-26 are effective. The channel response to the stimulation is measured and analyzed into the frequencies of interest. A set of errors is determined by measuring the difference between the measured response and a target response at each of the sensitive frequencies. The set of errors are compared to acceptable error limits and if the set of errors are not within limits, new control values are calculated from multiple control equations. New control values are generated and sent to the reproduce values are generated and sent to the reproduce amplifier circuit to adjust the equalizer control. This procedure is reiterated until the set of errors are within acceptable limits for each of the desired frequency components.

According to the fast closure method of the present invention, the autocalibration procedure may be optimized and the number of iterations of the procedure reduced. According to the method, a programmable signal source 30 stimulates the record/reproduce channel 10-18 with a complex waveform, such as a square wave or a psuedorandom wave having harmonic content at frequencies with are of interest in the equalization response of reproduce circuit 18. The initial values of control elements 20, 22, 24 and 26 are set by control processor 28 by means of control element control circuits 32, 34, 36 and 38 ($D_1$-$D_4$). Control elements 20-26 and control circuits 32-38 are preferably of the type disclosed in copending patent application Ser. No. 245,473, entitled "Voltage Control Resistor", Inventor R. D. Andersen. As disclosed therein, control elements 20-26 are radiation sensitive resistors having substantially identical resistance ranges. Control circuits 32-38 include radiation sources optically coupled to control elements 20-26. The radiation output of the radiation sources are controlled by digital signals originating in control processor 28. The level of the radiation output of the radiation source sets the value of the resistance of control elements 20-26 to a precise value.

Figure 2:
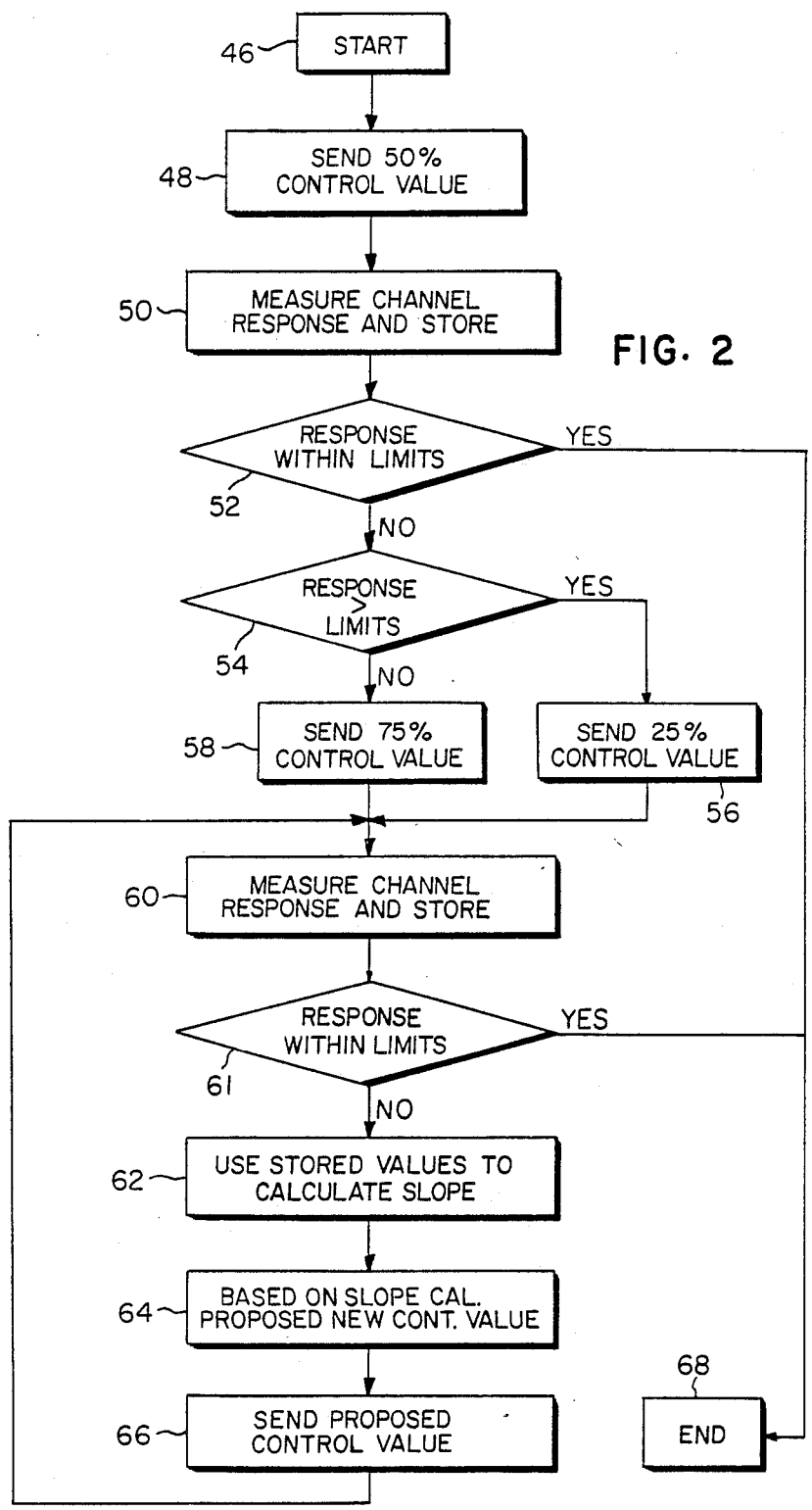
FIG. 2 is a flow diagram useful in explaining the method of the present invention.
Figure 3:
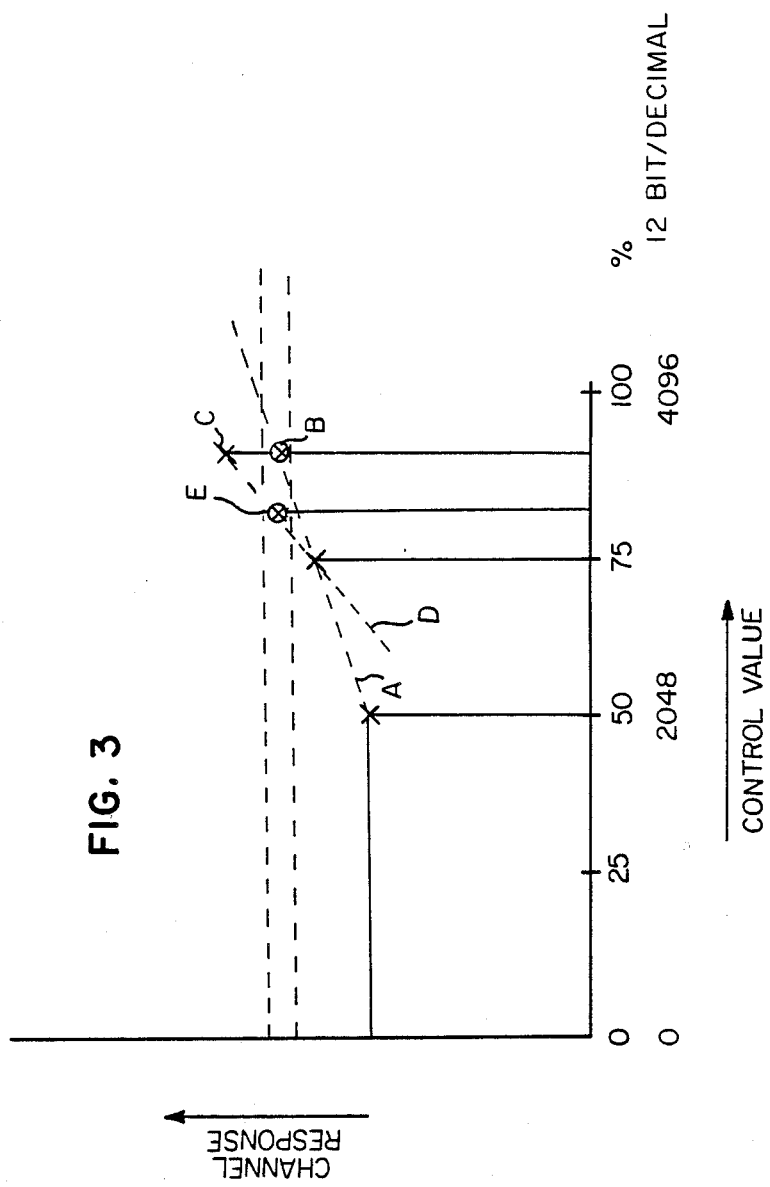
FIG. 3 is a diagram of response versus control value which illustrates the method of the present invention.

According to the method of the present invention as explained with respect to FIGS. 2 and 3, the initial control values set for control elements 20, 22, 24 and 26 are at the mid range (50%) of the control range. For example, if 12 bit digital signals are used as control signals for control circuits 32-38, the initial control values are set at 2048 (See FIG. 3). Thereafter, the complex waveform which stimulates the record/reproduce channel is converted into a digital signal by digital-to-analog converter (DAC) 40. The digital signed is analyzed into its harmonic components by waveform processor 42 and the amplitude of each of the harmonics measured and the values stored in memory 44 (blocks 46, 48 and 50 of FIG. 2).

The measured system response values are then compared to acceptable limit values which are stored in memory 44 (decision diamond 52 (FIG. 2)). If the measured response is within acceptable limits, then the calibration routine is done (box 68—FIG. 2). If the set of errors are not within acceptable limits, then the decision is made whether the response is greater than or less than the desired response (decision diamond 54—FIG. 2). If the response is greater than the desired response, then the 25% control values are sent to the control elements 20-26 (box 56—FIG. 2). If the measured response is not greater than the desired response, then the 75% control values are sent (box 58—FIG. 2).

The latter case is illustrated in FIG. 3 where the 75% control values are sent to change the resistances of control elements 20-26. The record/reproduce channel is stimulated again and the response measured and the values stored (box 60—FIG. 2). From the last two measured responses, the transfer slope-A is calculated (See FIG. 3). From this calculated slope a projected new control value is calculated based on the desired channel response (value B of FIG. 3; box 64—FIG. 2).

The projected new value is sent by control processor 28 to control circuits 32, 34, 36 and 38 to set the resistance values of control elements 20-26 (box 66—FIG. 2). The record/reproduce channel is stimulated again and the channel response measured. If the response value is within acceptable tolerance range, then the last control value is determined to be O.K. If not, then the procedures represented by boxes 60-66 of FIG. 2 are reiterated.

For example, if the response value C illustrated in FIG. 3, is too high and out of the acceptable tolerance range, then a new slope D is calculated from the last two measured response values. A new projected control value E is calculated from this slope. In FIG. 3 this control value results in a channel response which is within acceptable tolerance limits and the calibration routine is terminated.

The invention has been described in detail with particular reference to preferred embodiments thereof, but it will be understood that variations and modifications can be effected within the spirit and scope of the invention.

What is claimed is:

1. In conjunction with an autocalibration procedure for a data signal channel having an adjustable control element for varying the response characteristics of the channel, wherein said control element is adjustable by means of a digital control signal which has a range between 0-100%, a fast closure method comprising the steps of setting the control value of the adjustable control element at 50% control value;

stimulating the data signal channel and measuring the system response which is stored as a first value;

comparing the measured response to acceptable tolerance limits and if the response is within said limits ending the calibration procedure;

but if the response is greater than the acceptable limits, then, setting the control element at a 25% control value, if the measured response is greater than the desired response and setting the control value of the control element at a 75% control value, if the measured response less than the desired response;

stimulating the data signal channel a second time and measuring the response and storing said response as a second value;

if the second measured value is not within acceptable limits, using said first and second measured values to calculate a linear slope;

based on the calculated slope, projecting a new control value as a function of the desired channel response;

stimulating the channel a third time and measuring the resultant response as a third value;

if the measured response is within acceptable tolerance limits, then ending the procedure, but if the measured response is again outside of acceptable limits, then repeating the latter steps until an acceptable channel response is measured.

* * * * *